(12) United States Patent
Florin

(10) Patent No.: US 6,453,754 B1
(45) Date of Patent: Sep. 24, 2002

(54) MAGNETOINDUCTIVE FLOWMETER FOR MOVING FLUIDS

(75) Inventor: Wilhelm Florin, Duisburg (DE)

(73) Assignee: Krohne Messtechnik GmbH & Co. KG, Duisburg (DE)

( * ) Notice: Subject to any disclaimer, the term of this patent is extended or adjusted under 35 U.S.C. 154(b) by 0 days.

(21) Appl. No.: 09/504,008

(22) Filed: Feb. 14, 2000

(30) Foreign Application Priority Data

Feb. 23, 1999 (DE) .......................................... 199 07 864

(51) Int. Cl.⁷ .............................. G01F 1/58; G01F 1/00
(52) U.S. Cl. ...................................... 73/861.11; 73/861
(58) Field of Search .......................... 73/861.11, 861.12, 73/861.13, 861.14, 861.15, 861.08

(56) References Cited

U.S. PATENT DOCUMENTS

| | | | | |
|---|---|---|---|---|
| 5,301,556 A | * | 4/1994 | Nissen et al. ............. | 73/861.15 |
| 5,691,484 A | * | 11/1997 | Feller ...................... | 73/861.13 |
| 5,750,902 A | * | 5/1998 | Schwiderski ............. | 73/861.12 |
| 5,824,914 A | * | 10/1998 | Seppa et al. ............. | 73/861.11 |
| 6,085,599 A | * | 7/2000 | Feller ...................... | 73/861.13 |
| 6,092,428 A | * | 7/2000 | Brockhaus ............... | 73/861.14 |
| 6,237,424 B1 | * | 5/2001 | Salmasi et al. .......... | 73/861.11 |

FOREIGN PATENT DOCUMENTS

| | | |
|---|---|---|
| DE | 36 16 407 | 11/1987 |
| DE | 197 13 751 | 10/1998 |

OTHER PUBLICATIONS

Pat. Abstr. of Japan, P–358, 1985, vol. 9, No. 120, JP 60–4 812 (A).
Pat. Abstr. of Japan, P–187, 1983, vol. 7, No. 75, JP 58–5 615 (A).

* cited by examiner

Primary Examiner—Benjamin R. Fuller
Assistant Examiner—Andre Allen
(74) Attorney, Agent, or Firm—Cesari & McKenna LLP

(57) ABSTRACT

A magnetoinductive flowmeter for moving fluids incorporates a measuring tube; an electromagnet including a field coil and serving to generate a magnetic field that extends at least essentially perpendicular to the axis of the measuring tube; a power supply serving to feed a switched-DC field current to the field coil; two measuring electrodes positioned along a connecting line that extends at least essentially perpendicular to the axis of the measuring tube and to the direction of the magnetic field; and a detection circuit serving to analyze the measuring voltage of the measuring electrodes and to generate a flow signal; as well as a current regulator controlling the field current and a control circuit controlling or regulating the voltage at the field coil of the electromagnet; as well as a changeover bridge connected to the input of the field coil of the electromagnet. The undesirable switchover phase inherent in such systems is substantially shortened by means of an added power source which is capable of injecting into the field coil of the electromagnet a supplementary current immediately at the beginning of every half-wave of the field current that is present in the form of a switched direct current.

16 Claims, 4 Drawing Sheets

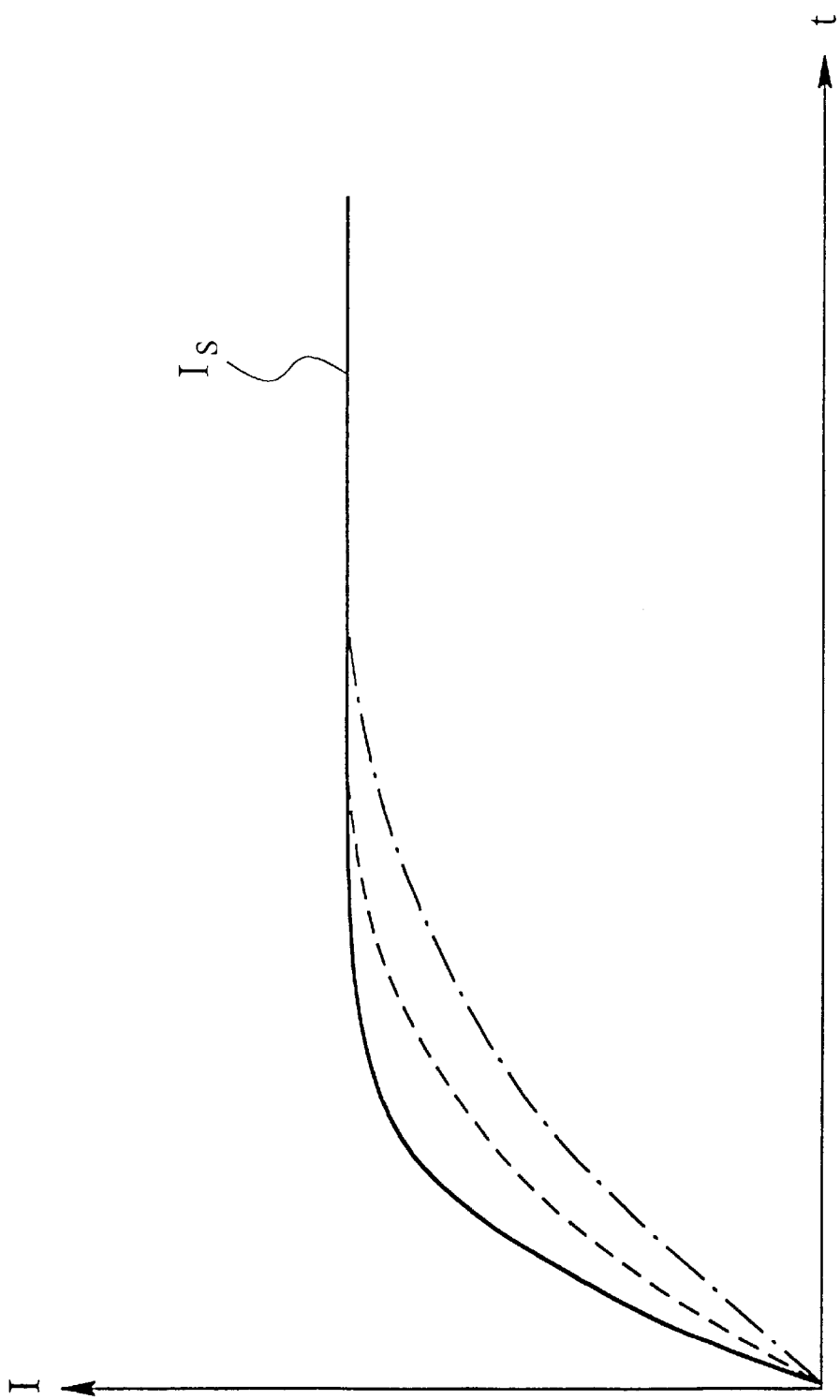

MAGNETOINDUCTIVE FLOWMETER FOR MOVING FLUIDS

This invention relates to a magnetoinductive flowmeter for moving fluids, incorporating a measuring tube, an electromagnet containing a field coil and serving to generate a magnetic field that extends at least essentially perpendicular to the axis of the measuring tube, a power supply serving to feed a switched DC field current to the field coil, at least two measuring electrodes positioned along a connecting line that extends at least essentially perpendicular to the axis of the measuring tube and to the direction of the magnetic field, and a detection circuit serving to analyze the measuring voltage of the measuring electrodes and to generate a flow signal; preferably also a current regulator controlling the field current and/or a controller controlling or regulating the voltage at the field coil of the electromagnet, as well as preferably a commutating or changeover bridge on the input side of the field coil of the electromagnet.

BACKGROUND OF THE INVENTION

The fundamental principle of the magneto inductive flowmeter for moving fluids goes all the way back to Faraday who in 1832 postulated that the principle of electrody-namic induction could be employed for measuring flow rates. According to Faraday's law of induction, a moving fluid which contains charge carriers and flows through a magnetic field will produce an electrical field intensity perpendicular to the flow direction and to the magnetic field. Magnetoinductive flowmeters operate on the basis of that law whereby a magnet, usually consisting of two field coils, generates a magnetic field, perpendicular to the direction of flow thin in the measuring tube. Within the magnetic field, each volume element of the fluid traveling through the magnetic field contributes, as a function of the field intensity building up in it, to the measuring voltage collected via the measuring electrodes. In conventional magnetoinductive flowmeters, the measuring electrodes are configured either for direct electrical or for capacitive connection with the moving fluid. A particular feature of magnetoinductive flowmeters is the proportionality between the measuring voltage and the flow rate of the fluid as measured across the diameter of the tube, i.e. between the measuring voltage and the volumetric flow.

Originally, industrial magnetoinductive flowmeters employed an alternating magnetic field. For reasons of cost economy, the electromagnet serving to produce the magnetic field was connected to the existing AC line voltage, generating essentially sinusoidal intensity changes. In these AC-operated magnetoinductive flowmeters, any line-voltage fluctuations would be directly transmitted to the electromagnet with a corresponding impact on the measuring accuracy of the magnetoinductive flowmeter. In order to still be able to obtain acceptably accurate measurements, magnetoinductive flowmeters employing an alternating magnetic field have been equipped with reference coils on the electromagnet, with the voltages induced in these reference coils being used to correct the measuring voltages at the measuring electrodes.

The problem with conventional magnetoinductive flowmeters operating with an alternating magnetic field is that the measuring voltage at the measuring electrodes is necessarily of the same frequency as the AC power mains. Moreover, in practice the measuring electrodes are additionally subjected to line-frequency interference voltages caused, for instance, by axial electric currents in the moving fluid, themselves caused, for example, by the grounding of pumps in the adjoining pipelines; these interference voltages are then superposed on the measuring voltages generated according to Faraday's law. This is a drawback in that it makes it difficult at best to obtain good measuring accuracy with magnetoinductive flowmeters employing an alternating magnetic field, substantially limiting their suitability for industrial use.

Since the mid-nineteen seventies there has been a growing trend toward the use of magnetoinductive flowmeters employing a switched DC magnetic field, i.e. the field current used is a polarity-switched direct current. These flowmeter designs avoid many of the problems encountered with magnetoinductive flowmeters working with alternating magnetic fields and can thus yield very high measuring accuracy levels to within one per mil.

Magnetoinductive flowmeters employing a switched DC magnetic field benefit from the fact that the magnetic field is constant during the measuring phase. No magnetic field, however, can be switched from one stare to another in zero time. That is an unescapable fact since the magnetic field contains energy which must first be extracted from the magnetic field and then reintroduced for the reverse polarity state (ref. FIG. 3 of the German patent disclosure 197 13 751). Consequently, there will be switchover phases during which the magnetic field is not constant and accurate measurements are therefore not possible. These switchover phases are especially bothersome for two reasons. First, measurements cannot be made during the switchover phase which constitutes dead time. Second, it is desirable in view of the interferences, caused as a function of the reciprocal value of the field frequency and emanating from the measuring electrodes, to work with as high a field frequency as possible, yet the field frequency is limited by the duration of the switchover phases.

SUMMARY OF THE INVENTION

It is therefore the objective of this invention to design and further improve the magnetoinductive flowmeter, discussed above in some detail, in such fashion that the aforementioned system-dependent switchover phases are shorter than they have been in conventional magnetoinductive flowmeters, thus allowing the field frequency, i.e. the frequency at which the DC magnetic field is switched, to be increased.

The magnetoinductive flowmeter according to this invention which solves the problems mentioned, is initially and fundamentally characterized in that it incorporates an additional power source, by means of which a supplementary current can be injected in the field coil of the electromagnet at the beginning of each half-wave of the field current present in the form of a switched direct current.

So far, mention has been made of only one electromagnet and one field coil of the electromagnet. That takes into account that there is usually one more component provided with the electromagnet, apart from the field coil, often in the form of a core and often featuring a pole shoe, which component in the case of a predetermined magnetic field intensity increases the magnetic induction and the magnetic flux. From the functional perspective, however, one electromagnet requires only one field coil, i.e. a field coil by itself can constitute an electromagnet. Therefore, the following description will occasionally refer to the field coil only rather than to the field coil of the electromagnet or to the electromagnet per se.

Magnetoinductive flowmeters of the type discussed generally incorporate two electromagnets, each with a field coil.

From the functional perspective, only one electromagnet, i.e. one field coil, is necessary. Where in typical fashion two electromagnets are used, each with a field coil, the field coils are usually connected in series. The following, however, will in many cases refer to only one electromagnet or the field coil of one electromagnet or simply one field coil. Whether two field coils are used or only one has no bearing on that which is significant in terms of the objective of, and solution provided, by this invention.

When a direct current is fed to a field coil having an inductance L and a resistance R, the direct current flowing through the field coil will increase within a time constant that is determined by the ratio between the inductance L and the resistance R. If a field coil has a predetermined inductance L, a desirably short time constant would be attainable by means of a large resistance R. However, the resistance R of a field coil is intrinsically undesirable since it uses up electrical power or electrical energy, a fact which is functionally unnecessary and therefore not wanted. It follows that a short time constant, however desirable, cannot be obtained by selecting a relatively large resistance R for the field coil.

The steady state to be achieved, i.e. the field current setpoint $I_S$, requires only the voltage U that is determined by Ohm's law; the necessary voltage U is the product derived from the field current setpoint value Is and the resistance R of the field coil. Existing technology provides for quicker attainment of the setpoint value $I_S$ by feeding to the field coil, at the point of the switchover, a voltage potential $U_U$ ($U_U$=voltage at the point of polarity switching), which voltage potential is greater than the fixed voltage U needed for attaining the field current setpoint value $I_S$. At that juncture, steps must be taken whereby, upon reaching the field current setpoint value $I_S$, the field current I is prevented from increasing further, since without any such steps curtailing the field current I, the latter would rise to the level resulting from the voltage $U_U$ and the resistance R of the field coil.

Conventional magnetoinductive flowmeters thus require a current regulator holding the field current I at the field-current setpoint value $I_S$ and a controller regulating or controlling the voltage U at the field coil of the electromagnet. If only a current regulator were used, that current regulator would consume the electric power, i.e. the electric energy derived from the product of the difference between the voltage $U_U$ and the voltage U on the one hand and the field current setpoint value $I_S$ on the other. Additionally employing a controller which controls or regulates the voltage U at the field coil of the electromagnet ensures that substantially less electrical power or energy is used up in the current regulator.

What has been accomplished in conjunction with the provision for an "increased voltage $U_U$ at the time of the switchover" and, associated therewith, by employing a current regulator and perhaps additionally a controller is consistent with the current state of the art. What this invention provides is an additional power source, in addition to or in lieu of the provisions explained above, by means of which it is possible, immediately at the beginning of every half-wave of the field current I obtained in the form of a switched direct current, to inject—for a brief moment only—a supplementary current $I_Z$ into the field coil. This additional current $I_Z$, i.e. the energy associated therewith, will relatively quickly withdraw more of the residual energy that is still present in the magnetic field prior to the switchover, thus permitting a substantial shortening of the switchover phase, i.e. a reduction of the time between the switchover point and the attainment of the field current setpoint value $I_S$.

BRIEF DESCRIPTION OF THE DRAWINGS

There are various specific approaches to the implementation and further enhancement of the magnetoinductive flowmeter according to this invention, the basic concept of which has been explained above. In this context, reference is made to the dependent claims and to the description of a preferred embodiment in conjunction with the attached drawings, in which:

FIG. 4 is a graph serving to explain the concept of the invention.

DETAILED DESCRIPTION OF AN ILLUSTRATIVE EMBODIMENT

Figure 1:
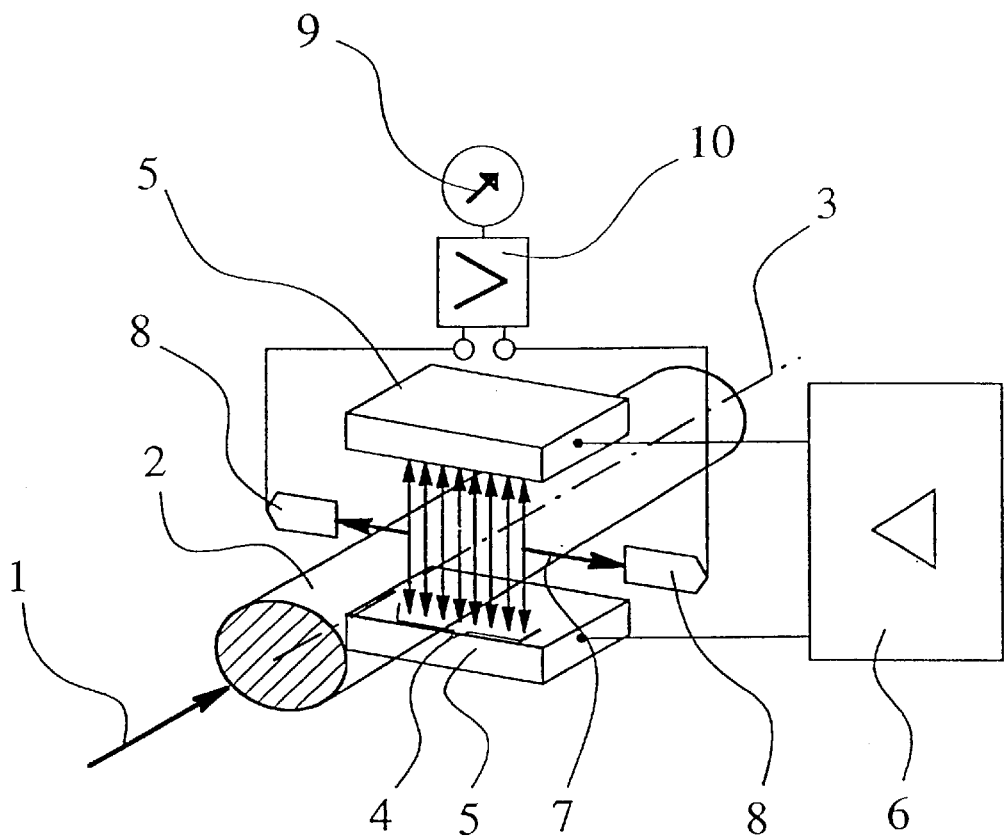
FIG. 1 is a schematic diagram for a general illustration of a magnetoinductive flowmeter.

As is shown in FIG. 1, a magnetoinductive flowmeter for moving fluids 1, indicated by an arrow, includes a measuring tube 2, an electromagnet—not shown—consisting of field coils 5 and serving to generate a magnetic field 4 that extends at least essentially perpendicular to the axis 3 of the measuring tube, a power supply 6 serving to feed a switched DC field current I to the field coils 5, two measuring electrodes 8 positioned along a connecting line 7 that extends at least essentially perpendicular to the axis 3 of the measuring tube and to the direction of the magnetic field, and a detection circuit 10 serving to analyze the measuring voltage of the measuring electrodes 8 and to generate a flow signal, indicated by an arrow 9.

Figure 2:
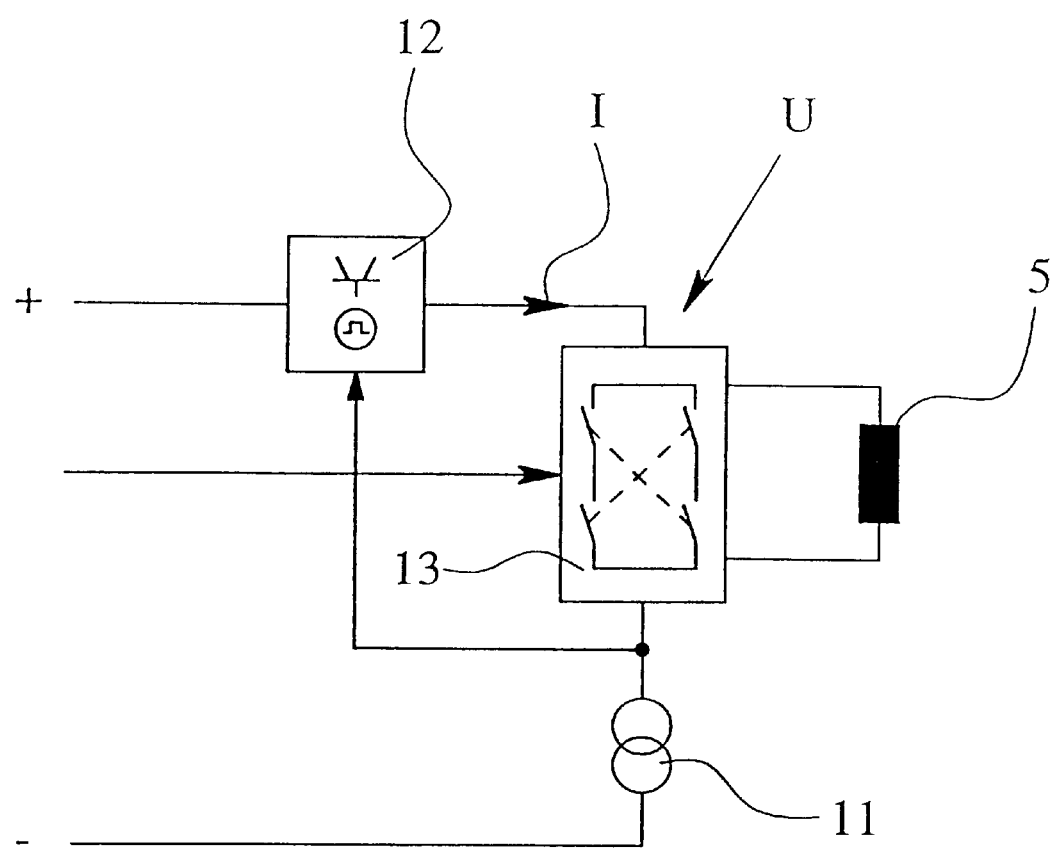
FIG. 2 is a schematic circuit diagram of a conventional magnetoinductive flow-meter.

In prior art on which this invention is based, magnetoinductive flowmeters include, in addition to the components according to FIG. 1, the provisions and functional elements shown in FIG. 2.

A basic component of the magnetoinductive flowmeter the circuitry of which is schematically outlined in FIG. 2, is a current regulator 11 which holds the field current I at a desired field current setpoint value $I_S$. Also provided is a controller circuit 12 which controls or regulates the voltage U at the field coils 5. The functional purpose of the current regulator 11 and of the controller circuit 12 has been explained further above.

Figure 3:
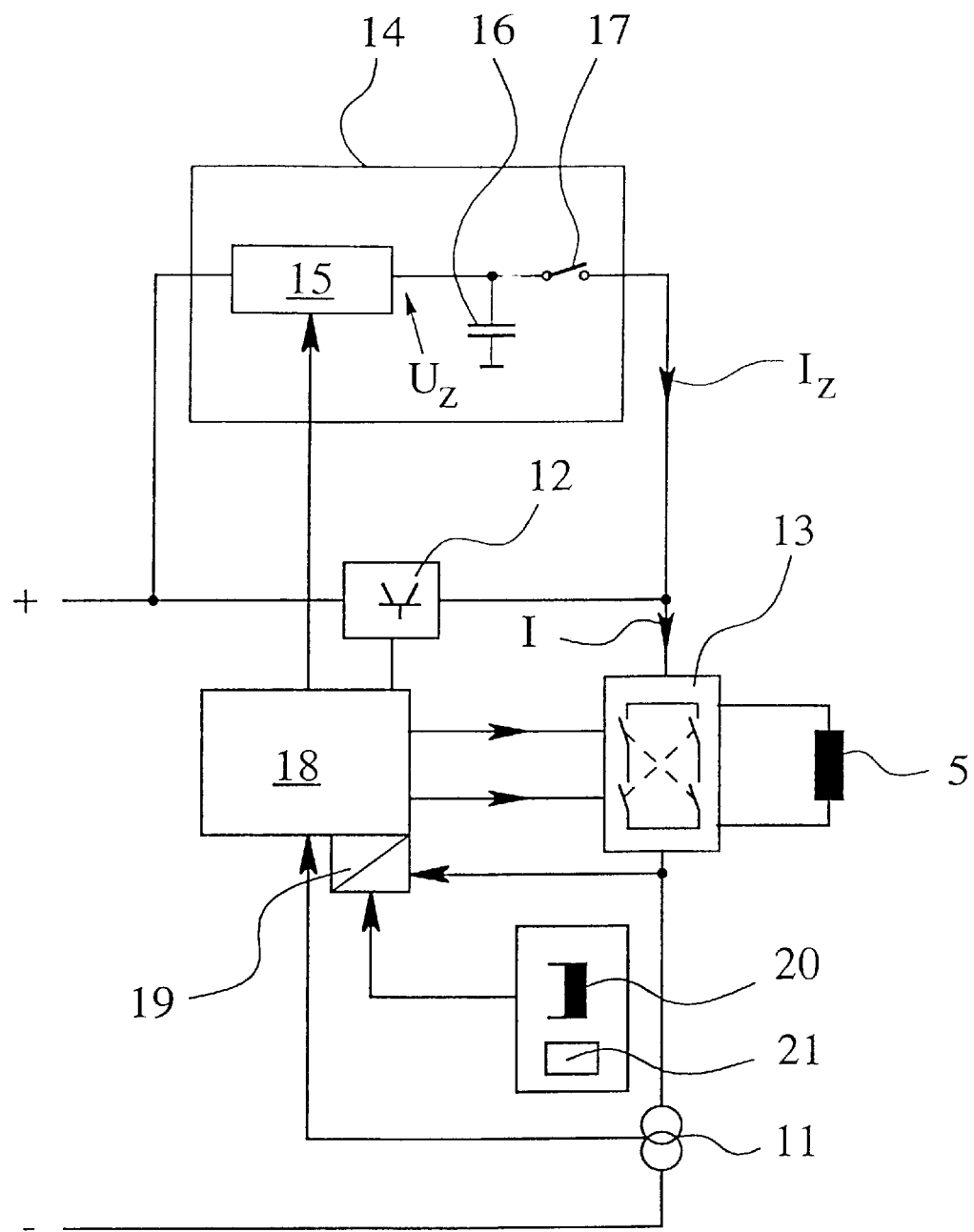
FIG. 3 shows, again in schematic fashion, the circuit diagram of a preferred design example of a magnetoinductive flowmeter according to this invention.

Magnetoinductive flowmeters according to prior art and according to this invention operate with a switched-DC magnetic field, whereby the field current flowing through the field coils 5 is a switched direct current. This is accomplished in both design examples, i.e. in the prior-art implementation per FIG. 2 and in the design example according to this invention as shown in FIG. 3, by virtue of a changeover bridge 13 connected on the input side of the field coils 5. This means that a field current I in the form of a switched DC current is generated in the field coils 5 not by changing the polarity of the power supply 6, not shown in FIGS. 2 and 3, but rather by switching the polarity of the field coils 5 with the aid of the—naturally electronic—changeover bridge 13.

The magnetoinductive flowmeter according to this invention is further equipped with an additional power source 14, shown in FIG. 3. By means of this additional power source 14, it is possible to inject a supplementary current $I_Z$ into the field coils 5 of the electromagnet immediately at the beginning of every half-wave of the switched-DC field current I.

In the design example shown, the additional power source 14 consists of an auxiliary power supply 15, a storage capacitor 16 connected to the output of the auxiliary power supply 15, and a feed-in switch 17 connected in-line with the storage capacitor 16. The additional power source 14 is controllable as a function of the field current I flowing through the field coils 5 of the electromagnet. In specific terms, the voltage potential $U_Z$ of the auxiliary power supply 15 to which the storage capacitor 16 is charged by the auxiliary power supply 15, is controllable as a function of the inductance L and the resistance R of the field coils 5 of the electromagnet.

In the steady state, i.e. when the field current I flowing through the field coils 5 is at its setpoint value $I_S$, the feed-in switch 17 is in the off-mode; the additional power source 14 has no effect on the field current I. At each switchover point following the steady state, i.e. immediately at the beginning of every half-wave of the switched-DC field current I passing through the field coils 5, the feed-in switch 17 can be activated into the conductive on-mode. As a result, an additional current $I_Z$ flows from the storage capacitor 16 through the field coils 5 of the electromagnet; in other words, the electrostatic energy stored in the storage capacitor 16 counteracts the residual electromagnetic energy initially remaining in the field coils 5, thus shortening the switchover phases. As soon as the switched-DC field current I flowing through the field coils 5 of the electromagnet reaches the field-current setpoint value $I_S$, the feed-in switch 17 can be deactivated into the off-mode so that no further supplementary current $I_Z$ will flow from the additional power source 14 through the field coils 5.

The magnetoinductive flowmeter according to this invention, the circuitry of which is schematically shown in FIG. 3, is further equipped with a microcontroller 18. In the design example illustrated, the microcontroller 18 represents a central, functional entity of the magnetoinductive flowmeter according to this invention. The controller circuit 12 can be manipulated by the microcontroller 18, by way of an analog-to-digital converter 19, as a function of the field current I flowing through the field coils 5. The microcontroller 18 also serves to operate the changeover bridge 13. Finally, the additional power source 14 as well can be controlled by the microcontroller 18 by way of the analog/digital converter 19 as a function of the field current I flowing through the field coils 5 of the electromagnet.

FIG. 3 shows a design example which is preferred insofar as a magnetic-field sensor is added to the field coils 5 of the electromagnet, for instance a reference coil 20 and/or a Hall effect sensor 21. The capabilities obtainable by adding a magnetic-field sensor to the field coils 5 are described in the German patent disclosure 197 13 751 and, for redundancy considerations, they are not repeated here.

The FIG. 4 graph shows, above the time line t, the field current I in the field coils of the electromagnet of a magnetoinductive flowmeter.

The dot-dash line indicates the curve of the field current I when the field coils 5 receive only the voltage needed for the intended field current setpoint value $I_S$; the switchover phase, i.e. the time to reach the field-current setpoint value $I_S$, is relatively long.

The dashed line represents the curve of the field current I, over time t, for the prior-art design example shown in FIG. 2, employing a current regulator 11 and a control circuit 12. Due to the fact that at the switchover point, the voltage in the field coils 5 is significantly higher than for the steady state i.e. for the time span following attainment of the field current setpoint value $I_S$, the upslope of the field current I is steeper and the switchover phase is thus shorter.

The solid line represents the curve of the field current I, over time t, for the magnetoinductive flowmeter according to this invention. Due to the injection of a supplementary current $I_Z$, derived from the additional power source 14, into the field coils 5 of the electromagnet, the rising slope of the field current I is steeper yet, further reducing the switchover phase.

What is claimed is:

1. A magnetoinductive flowmeter for moving fluids, comprising a measuring tube, an electromagnet field coil positioned adjacent to said measuring tube and serving to generate a magnetic field that extends at least essentially perpendicular to the axis of the measuring tube, a power supply connected to the filed coil to feed a switched-direct-current field current to the field coil, at least two measuring electrodes positioned adjacent to the measuring tube along an imaginary line that extends at least essentially perpendicular to the axis of the measuring tube and to the direction of the magnetic field, a detection circuit connected to the measuring electrodes to analyze the measuring voltage of the measuring electrodes and to generate a flow signal, and an additional power source connected to the field coil which injects a supplementary current into the field coil immediately at the beginning of every half-wave of said field current.

2. The magnetoinductive flowmeter as defined in claim 1, wherein the additional power source consists of an auxiliary power supply, a storage capacitor connected to the output of auxiliary power supply, and a feed-in switch connected to the output of the storage capacitor.

3. The magnetoinductive flowmeter as defined in claim 1, wherein the voltage of the additional power source is controllable as a function of the field current flowing through the field coil of the electromagnet.

4. The magnetoinductive flowmeter as defined in claim 3, wherein the voltage of the additional power source is controllable as a function of the inductance and the resistance of the field coil of the electromagnet.

5. The magnetoinductive flowmeter as defined in claim 2, wherein immediately at the beginning of every half-wave of the switched-DC field current, the feed-in switch is activated in its conducting state.

6. The magnetoinductive flowmeter as defined in claim 3, wherein when the field current flowing through the field coil has reached the field-current setpoint value, the feed-in switch is deactivated into its nonconducting state.

7. The magnetoinductive flowmeter as in claim 1, incorporating a microcontroller.

8. The magnetoinductive flowmeter as defined in claim 7, incorporating a control circuit wherein as a function of the field current flowing through the field coil of the electromagnet, the control circuit is operated by the microcontroller via an analog/digital converter.

9. The magnetoinductive flowmeter as defined in claim 7, incorporating a changeover bridge wherein the changeover bridge is controlled by means of the microcontroller.

10. The magnetoinductive flowmeter as defined in claim 7, wherein as a function of the field current flowing through the field coil of the electromagnet, the additional power source is controlled by the microcontroller via an analog/digital converter.

11. The magnetoinductive flowmeter as defined in claim 1 or 2, wherein a magnetic-field sensor, such as a reference coil or a Hall sensor, is added to the field coil.

12. The magnetoinductive flowmeter as defined in claim 1 or 2, incorporating a current regulator controlling the field current.

13. The magnetoinductive flowmeter as defined in claim 1 or 2, incorporating a control circuit controlling the voltage at the field coil of the electromagnet.

14. The magnetoinductive flowmeter as defined in claim 1 or 2, incorporating a current regulator controlling field current and a control circuit controlling the voltage at the field coil of the electromagnet.

15. The magnetoinductive flowmeter as defined in claim 1 or 2, incorporating a changeover bridge connect to the input side of the field coil of the electromagnet.

16. The magnetoinductive flowmeter as defined in claim 1 or 2, incorporating a current regulator controlling the field current, a control circuit controlling the voltage at the field coil of the electromagnet, and a changeover bridge connected to the input side of the field coil of the electromagnet.

* * * * *